(12) United States Patent
Waldman et al.

(10) Patent No.: US 7,770,106 B2
(45) Date of Patent: Aug. 3, 2010

(54) DYNAMIC GENERATION OF COMPLIANT STYLE SHEETS FROM NON-COMPLIANT STYLE SHEETS

(75) Inventors: Chad Garrett Waldman, Redmond, WA (US); Christian Hagel-Sørensen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1085 days.

(21) Appl. No.: 11/384,054

(22) Filed: Mar. 17, 2006

(65) Prior Publication Data

US 2007/0220480 A1   Sep. 20, 2007

(51) Int. Cl.
*G06F 17/00* (2006.01)
(52) U.S. Cl. .................. 715/235; 715/234; 715/236
(58) Field of Classification Search .......... 715/235, 715/236, 234, 239
See application file for complete search history.

(56) References Cited

U.S. PATENT DOCUMENTS

| | | | |
|---|---|---|---|
| 6,263,352 B1* | 7/2001 | Cohen | 715/206 |
| 6,957,394 B1 | 10/2005 | Fernandez et al. | |
| 6,992,681 B2 | 1/2006 | Evans et al. | |
| 2002/0103858 A1* | 8/2002 | Bracewell et al. | 709/203 |
| 2002/0123879 A1 | 9/2002 | Spector | |
| 2002/0165881 A1 | 11/2002 | Shelton | |
| 2003/0037076 A1* | 2/2003 | Bravery et al. | 707/517 |
| 2003/0084405 A1 | 5/2003 | Ito et al. | |
| 2003/0164957 A1 | 9/2003 | Komaki | |
| 2003/0237046 A1 | 12/2003 | Parker et al. | |
| 2004/0034613 A1 | 2/2004 | Purvis et al. | |
| 2004/0230899 A1 | 11/2004 | Pagnano et al. | |
| 2004/0268247 A1* | 12/2004 | Rosenpflanzer et al. | 715/523 |
| 2005/0015722 A1 | 1/2005 | Niyogi et al. | |
| 2005/0160359 A1 | 7/2005 | Falk et al. | |
| 2006/0136819 A1* | 6/2006 | Tolle et al. | 715/523 |
| 2006/0242571 A1* | 10/2006 | Lin | 715/523 |

FOREIGN PATENT DOCUMENTS

| | | |
|---|---|---|
| WO | WO-01/90873 A1 | 11/2001 |
| WO | WO-2005/038610 A2 | 4/2005 |
| WO | WO 2005045702 A2 * | 5/2005 |

OTHER PUBLICATIONS

Cole, Kevin; Hewlett Packard Company Research Disclosure, "Accessibility web-browser cascading style sheet writer control"; Research Disclosure Database No. 472027, Aug. 2003.*

(Continued)

*Primary Examiner*—Stephen S Hong
*Assistant Examiner*—I-Chan Yang
(74) *Attorney, Agent, or Firm*—Marshall, Gerstein & Borun LLP

(57) ABSTRACT

The claimed method and system provides programmers of client-server applications the ability to implement extensions to a standard style sheet language by using a preprocessor at a client to first parse, extract, and transform noncompliant, proprietary code. A new standards compliant style sheet may be created based on the transformed noncompliant code. This style sheet may then be executed on a client browser. The claimed system may be used to conform a client application schema with a client operating system schema.

16 Claims, 7 Drawing Sheets

OTHER PUBLICATIONS

Style Sheet Switcher (v1.0); Copyright © 1998-2006 Dynamic Drive; http://www.dynamicdrive.com/dynamciindex9/stylesheetswitcher.htm.

Create Your Own Multi-Themed Xoops Site; dated May 12, 2005; http://xoops-tips.com/news-print.storyid-89.htm.

Using Windows XPVisual Styles; © 2006 Microsoft Corporation; http://msdn.microsoft.com/library/defaultasp?url=/library/enus/shellcc/platform/commctls/userex/cookbook.asp.

* cited by examiner

| | |
|---|---|
| AxGetSysColor(<colorname>) | Returns the hex code for the system color. Example GetSysColor("ButtonFace") |
| AxBlendColors(<color 1>, <color 2>, <blend percent>) | Returns the hex code for the blend of <color 1> with <color 2> taking <blend percent> of <color 1> and (100 - <blend percent>) of <color 2>. The colors can be specified either in hex or by using AxGetSysColor as in the following example (in the patent) |

Figure 6

DYNAMIC GENERATION OF COMPLIANT STYLE SHEETS FROM NON-COMPLIANT STYLE SHEETS

BACKGROUND

A style sheet language may be used to describe the presentation of a document written in a markup language. One such style sheet language may be cascading style sheets (CSS). CSS may be used to define colors, fonts, layout, and other aspects of document presentation. CSS may enable the separation of document content (written in HTML or a similar markup language like XML) from document presentation (written in CSS). This separation may improve content accessibility, provide more flexibility and control in the specification of presentational characteristics, and reduce complexity and repetition in the structural content.

Current client-server applications may use a browser front end to display client functionality to a user. Some of these client-server applications may be designed to provide a user interface that conforms its screen element schema to a schema of an operating system of the client. One method of doing this may be to hardcode a style sheet for execution at the client that causes the client application display to mimic that of an operating system schema. While this may be adequate for operating systems that only have a few non-alterable schema sets, this may not be prudent for operating systems that provide a customizable schema set (such as, for example, Windows XP® that allows a user to modify individual elements of a schema set) or that have many schema sets.

Because existing style languages may be designed to be generic functional languages, client specific functionality may be limited. Moreover, existing style sheet languages may not provide function extensions, and thus, existing browsers that are compliant with a standard style sheet language may not be able to process additional functions. In order to extend a style sheet language for the purpose of providing schema matching, for example, an arduous process of petitioning a standards board may be required. While style sheets can be individually hard coded, additional functionality may be needed to enable efficient schema matching.

SUMMARY

The claimed method and system provides programmers of client-server applications the ability to conform a client application schema with a client operating system schema. The claimed method and system may also be used to synchronize other operating specific characteristics with a client-server application.

In one embodiment, the claimed system may include a preprocessor at the client to parse and isolate proprietary, noncompliant language in a style sheet, transform the noncompliant language, and create a new compliant style sheet for execution by a standard style sheet browser at the client.

In one embodiment, the claimed system transforms the noncompliant portion based on operating system settings, which may be contained in an operating system index or table. In a further embodiment, style sheet parameters are tied into an operating system registry, thereby allowing dynamic generation of new style sheets for an application corresponding to changes in user customization of an operating system schema.

In one embodiment, the preprocessor may be part of a client executable, a browser applet/plugin, or a separate component running as a separate process on a client machine. In this embodiment, HTML pages and corresponding style sheet files, such as CSS files, may be hosted by a server, where the style sheets originally may contain noncompliant code. The noncompliant code may represent proprietary functions and/or parameters. The noncompliant functions may be executed as part of a transformation step at the client by a preprocessor, the client operating system, or as a separate process on the client.

DRAWINGS

FIG. 6 illustrates possible proprietary functions used in an embodiment; and

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
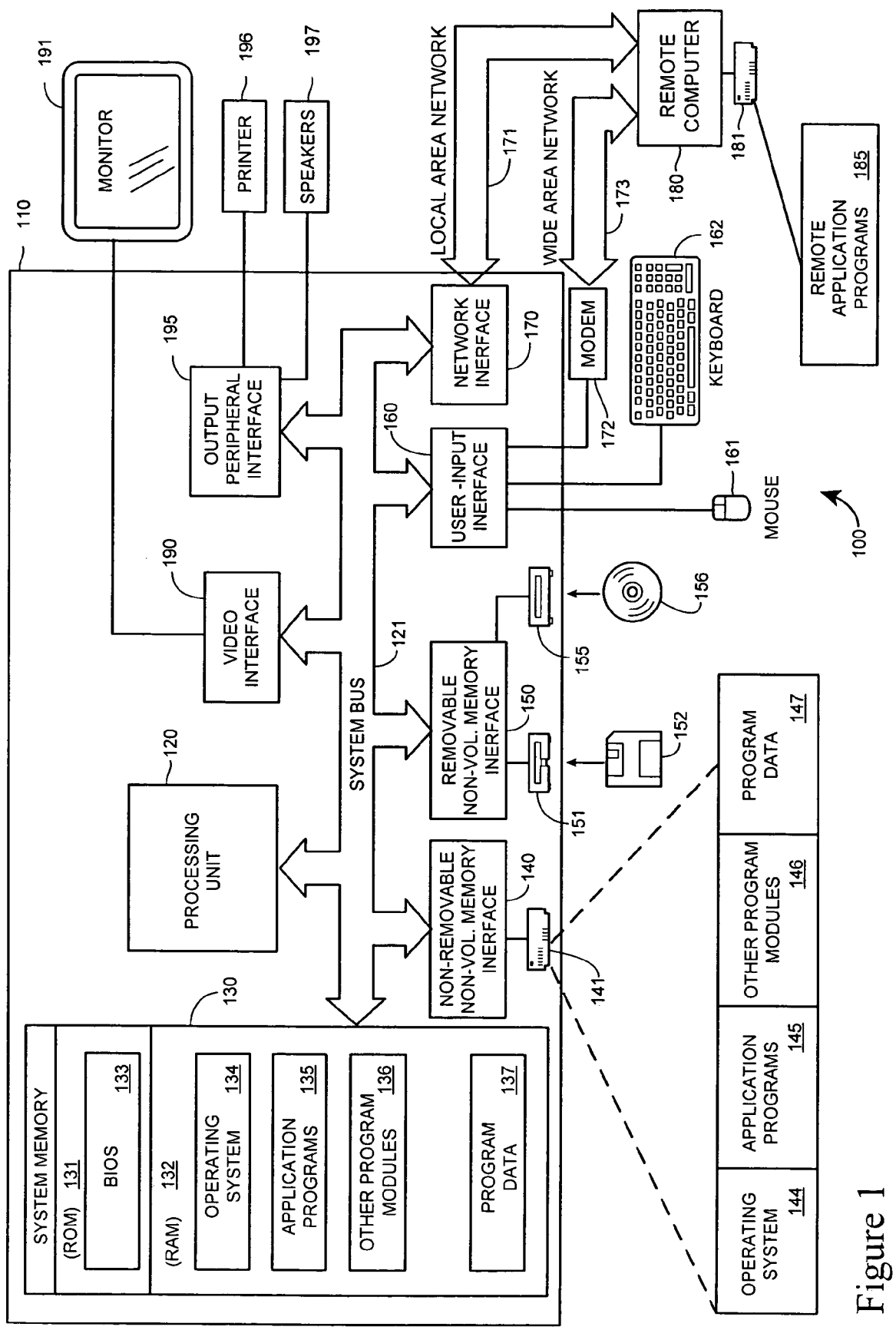
FIG. 1 illustrates a block diagram of a computing system that may operate in accordance with the claims.

FIG. 1 illustrates an example of a suitable computing system environment 100 on which a system for the blocks of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

The blocks of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The blocks of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media may be any available media that may be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components may either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections illustrated are exemplary and other means of establishing a communications link between the computers may be used.

An operating system (OS) may provide a set of different schema for a user to select from for use on a display, such as display 191. The schema may provide a set of non-modifiable characteristics for each screen element, such as color, gradient, texture, etc. In one embodiment, the claimed system may be used on a Windows XP® operating system environment. In Microsoft Windows XP®, a user may be provided Windows XP® specific schema choices of blue, green, and silver. In these schemas, a user may not able to change characteristics of individual screen elements, such as the color of buttons on the screen. Alternatively, a user may be provided a modifiable schema set in which a default set of display parameters are provided for the screen elements used in the display, where the user may be able to change particular display parameters for a screen element. For example, a user may be able to change the texture or color of icons, a background, buttons, etc. (which may form a schema set), even if the button colors have a default color value for the selected schema.

For fixed schema sets, a client application developer may provide an application graphical user interface that conforms to the OS fixed schema set by using a specific style sheet. In other words, a style sheet may be hard coded for each fixed schema set. However, this may not be convenient when there may be many schema sets. Also, in the case of modifiable schema sets, hard coding a style sheet for the schema may be made more difficult because a style sheet may need to be created for every possible parameter value. Function extensions may be used to make style sheets versatile, however, existing style sheet languages may not support extensions.

Figure 2:
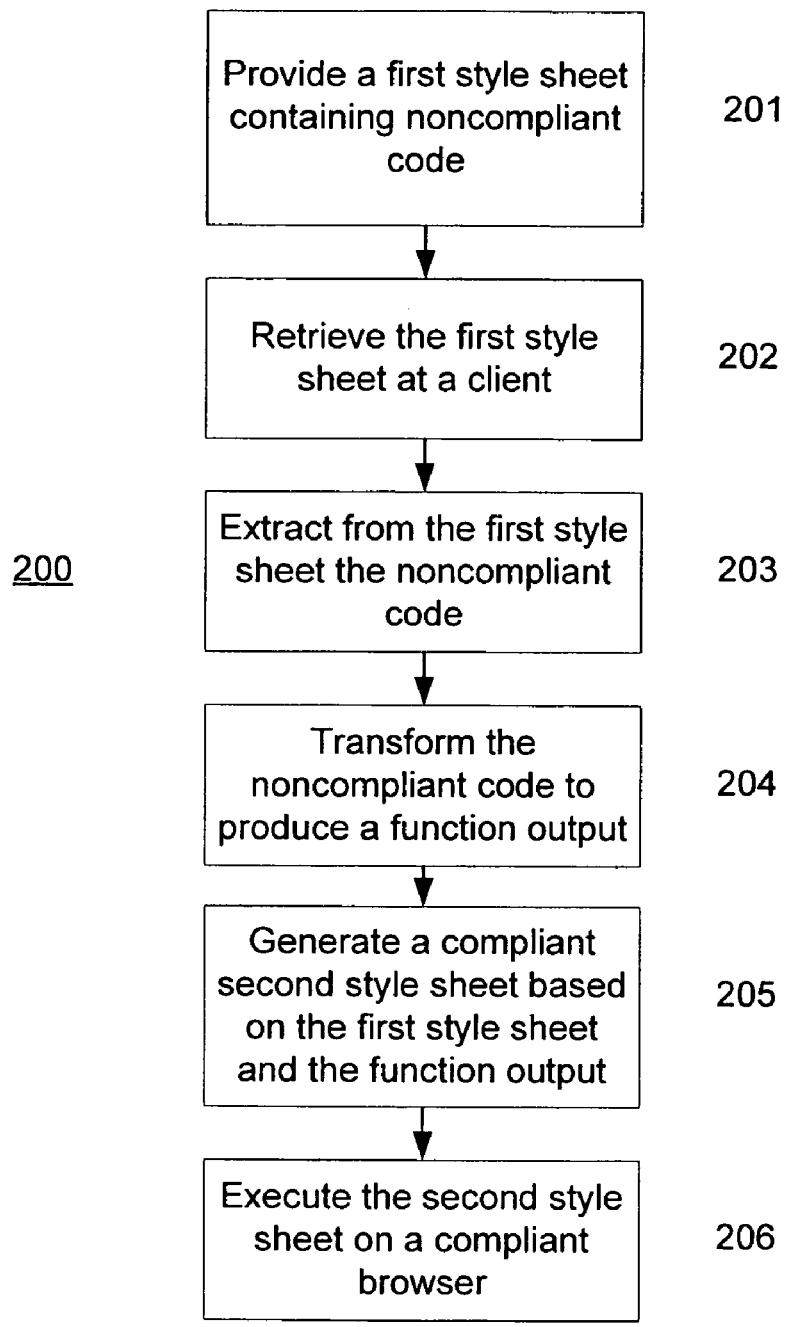
FIG. 2 illustrates a general process embodiment.

FIG. 2 illustrates a general process embodiment 200. This process 200 involves providing a first style sheet which may have noncompliant language portions 201. This style sheet may enable programmers to use proprietary, nonstandard functions in a coded style sheet. In other words, while the style sheet may be coded partially in a standard style sheet language, certain portions may be coded using proprietary functions designed by a programmer. Standard style sheet languages may include CSS, DSSSL, XSL, and JSSS.

The noncompliant first style sheet may be stored on a server and may be retrieved at a client 202. The first style sheet may be parsed for noncompliant code, which is then extracted 203 and transformed via one or more functions to produce an output 204. A second compliant style sheet may then be generated 205 based on the first style sheet and the output. This second style sheet may then be executed on a browser 206 compliant with a standard style sheet language.

Figure 3:
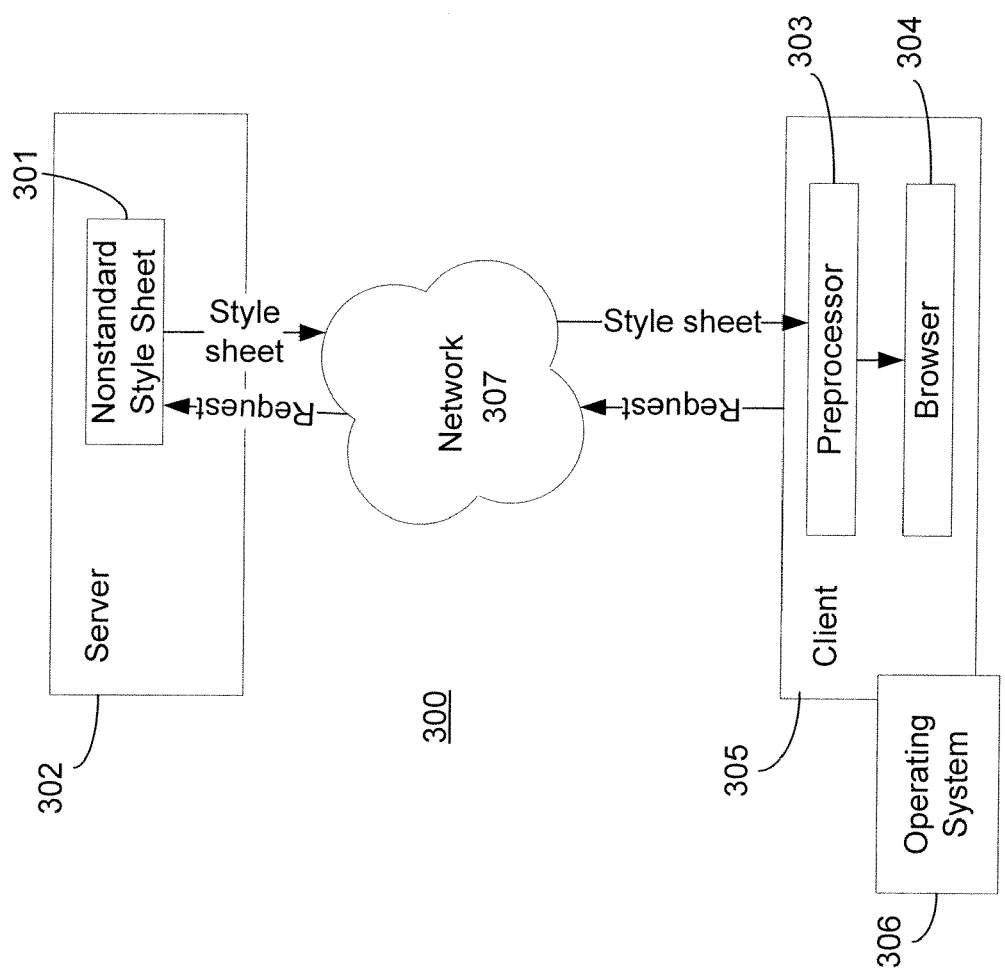
FIG. 3 illustrates a general system embodiment.

FIG. 3 illustrates a general system 300 embodiment. In this programming model, a noncompliant first style sheet 301 may be stored in a central server 302. A client 305 may request a page through a network 307 that used the corresponding first style sheet. In order to enable the proprietary code in the first style sheet to work on a standard style sheet compliant browser, a preprocessor 303 may parse through the first noncompliant style sheet 301 to identify the nonstandard coding/language in the style sheet. The preprocessor 303 may then extract these nonstandard portions and perform a translation of the nonstandard portions and then create a second style sheet that is compliant with a standard style sheet language. The translation/transformation may create a style sheet that can be executed on a browser 304 capable of reading a standard style sheet language. In one embodiment, the preprocessor 303 may be an application running on a client 305. In another embodiment, the preprocessor may be an application provided by a client operating system 306.

The noncompliant code may include nonstandard functions and/or parameters that are not part of a standard style sheet language. The preprocessor 303 may facilitate in executing the nonstandard functions on the client and/or translate the noncompliant parameters. The functions may be executed via the preprocessor or via an associated client application, such as a client executable. The parameters may be translated via the preprocessor or via an associated client application. The client functionality may be client operating system functions available at the client or through the client. The client functionality may be based on stored parameters of the client.

Figure 4:
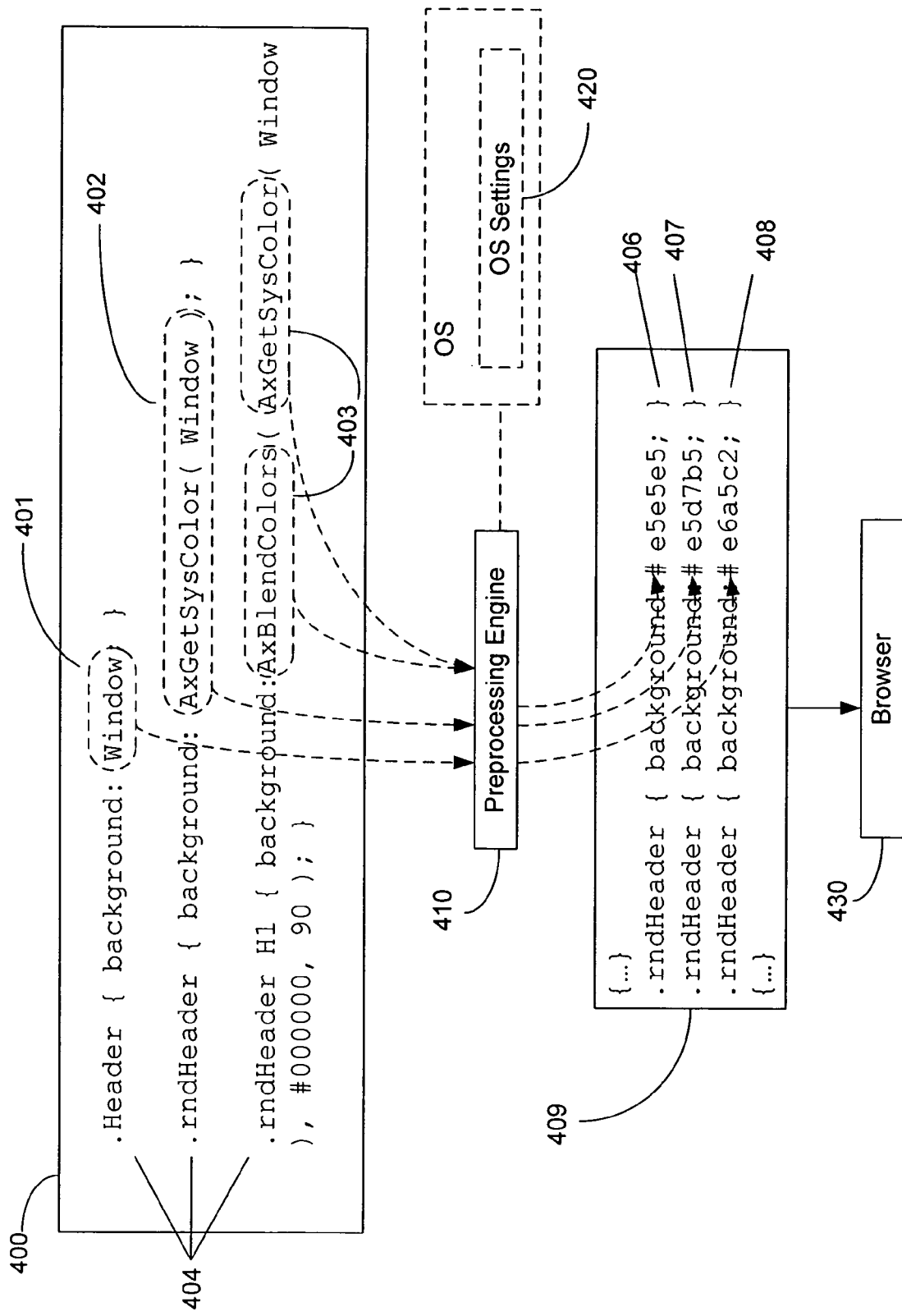
FIG. 4 illustrates a preprocessing diagram.

In one embodiment illustrated in FIG. 4, a noncompliant style sheet 400 may include nonstandard code portions 401, 402, 403 that represent an argument or parameter of a standard style sheet language function 404. A preprocessor 410 may simply extract the nonstandard function 402, 403 or parameter 401, execute the function 402, 403 or translate the parameter 401, and then reinsert the result of the function or translation into the argument of the standard function of the style sheet 406, 407, 408. A resulting compliant style sheet 409 may then be executed by a browser 430. The nonstandard parameter may be translated using a settings lookup table 420 or system registry (to be discussed further below). The preprocessor 410, the client application, and/or a client operating system may execute the function or translate the parameters.

Figure 5:
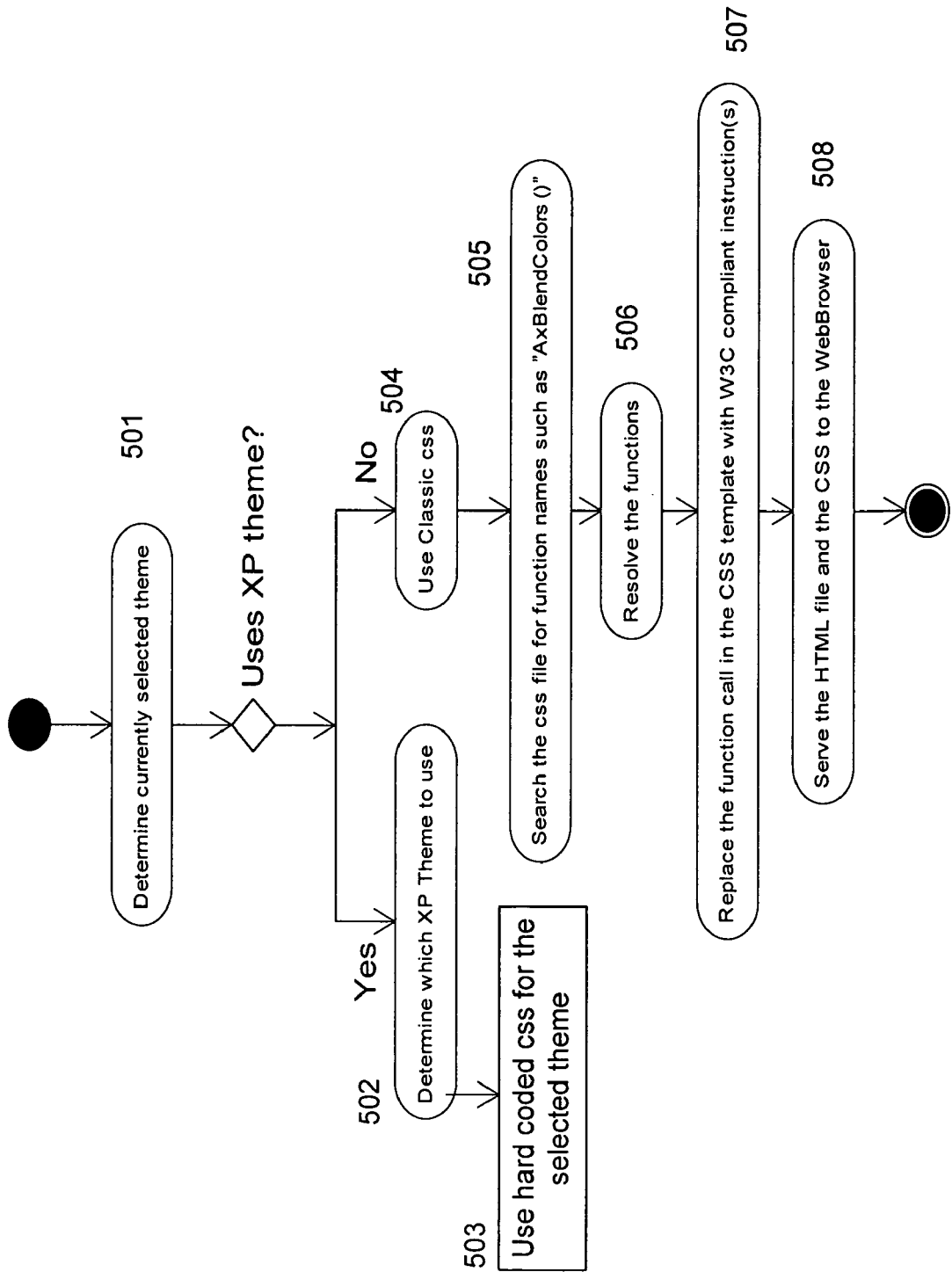
FIG. 5 illustrates an embodiment of the process for conforming a schema to an operating system schema.

In an embodiment illustrated in FIG. 5, the system may be used in a client application to conform a display schema of a client application to a schema of an operating system, such as Windows XP®, running on the client. A client application may first determine whether an Windows XP® fixed theme, or schema set, may be selected 501. If an Windows XP® theme is used, the corresponding Windows XP® schema may be determined 502 and then a hard coded CSS file may be loaded for a client browser for the selected theme 503. If an Windows XP® theme may not used, then a modifiable classic theme may be selected, in which case a default classic CSS file may be retrieved 504. The CSS may contain noncompliant code and thus, the CSS file is parsed for any noncompliant functions 505. The noncompliant functions may then resolved or transformed 506 and the noncompliant functions may be replaced with W3C compliant CSS code 507. The resulting CCSS file may then be loaded into the browser 508.

As discussed above, some OS schema sets may be modifiable by a user. In some operating systems, a user may be provided a user interface screen for making adjustments to the display at the system level. These adjustments may be implemented by changing operating system settings, which may be represented by values stored in an operating system table or index. One example of an operating system table that may store operating system settings is an operating system registry that may contain schema parameters and values for the operating system display. In one embodiment, preprocessing may be based on an operating system registry. It should be noted, however, that any OS settings lookup table, index, or other settings storage media may also be used. In this embodiment, noncompliant parameters of the style sheets may, for example, represent operating specific colors. In one implementation, a standard style sheet language may require the use of hexadecimal color code values that are not operating system specific, while the operating system may have its own set of predefined color values that may have string representations, such as "Window" color. Because the operating system may have its own predefined color schema, the claimed system enables a style sheet programmer to simply use operating specific parameters such as "Window" to designate colors in the style sheet. The preprocessor may extract the nonstandard parameter and then translate them via an operating system registry to get an equivalent hexadecimal code. In this manner, programmers can provide operating system defined colors to styles sheets without have to predetermine hexadecimal code values.

When a user changes a color assigned to an operating system color (registry defined color), such as button color, an application programmer may desire to have that change reflected in the application display. In one embodiment, the style sheet may dynamically reflect the changes to the color values in a registry (or other settings storage medium) and update the style sheet schema accordingly. This may be performed by loading an updated style sheet whenever a user change is detected. Thus, for example, when a user changes the button color from blue to teal, the style sheet settings based on the button color may also change from blue to teal.

Possible functions that may be defined to extend a standard style sheet language are illustrated in the chart of FIG. 6. A first function GetSysColor, may provide a translation between a operating system color into a hexadecimal color code that may be compliant with cascading style sheet (CSS). The operating system color may represent a general screen element, such as "Windows," and/or a color name.

Another function may be AXBlendColor. A standard style sheet language, such as cascading style sheet (CSS), may not provide a function to blend two colors together. In other words, CSS may only provide a color function that only takes a single color value. A blending function (AXBlendColor) may take two arguments and produce a single color result that is a color blend of the two arguments.

Figure 7:
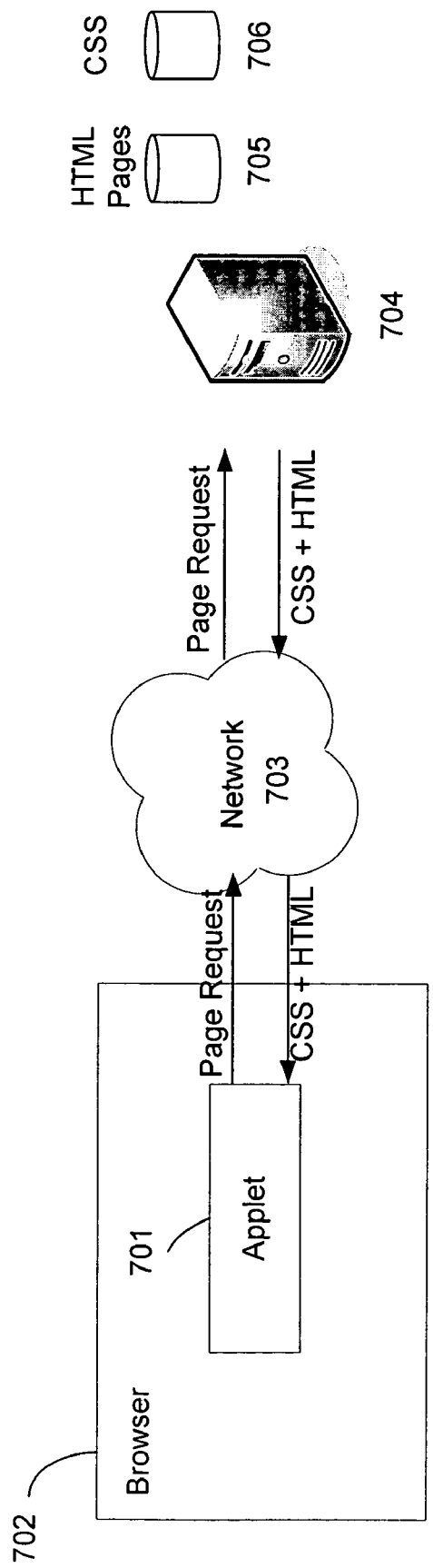
FIG. 7 illustrates an applet preprocessor embodiment.

Preprocessing may occur in the browser itself as part of the functionality originality designed into a browser's code. However, where preprocessing is implemented by the browser, a programmer may be limited in the number of available proprietary functions by what may be built into the browser during the design of the browser. In another embodiment, the preprocessor may be provided to the browser as an applet or browser extension. In a further embodiment illustrated in FIG. 7, the preprocessor may be implemented as an applet 701. An applet 701 may be a software component that runs in the context of another program, such as a web browser. An applet may execute only on a "client" platform of a system. As such, an applet 701 provides functionality or performance beyond the default capabilities of its browser. A web component may be implemented as an applet. A toolbar may be an applet.

The applet 701 may be downloaded and installed on a browser 702. When a user browses a certain page, a request may be created and sent through a network 703, such as the Internet, to a web server 704. The web server may store and dispense a set of HTML files 705 for the request as well as a corresponding set of style sheets 706. The style sheets may contain proprietary, nonstandard code which may need to be preprocessed before submitting the style sheet to a standard style sheet compliant browser 702. The request may prompt the server to return a set of HTML pages and corresponding style sheets. The style sheets may then be received at the client browser 702. Before the style sheets may be executed by the browser, the applet 701 may intercept the styles sheets and parse and extract any nonstandard code/language. The applet may then execute any proprietary function and/or translate any nonstandard parameters. The applet may then insert standard language parameters and function results back into the style sheet for execution by the browser.

An advantage of using an applet may be that the applet may be downloaded at runtime, thereby including any updated functions each time the browser application is started up. Alternatively, compatibility and extensibility may be provided by implementing the preprocessor as part of the client server application, thereby ensuring that any style sheet functions are designed for execution with a specific client packaged preprocessor. In other words, the server side pages may be synched with the version of the client application dispensed to a client.

The claimed system may enhance a programming effort for a client-server network application. Preprocessing enables extensibility by allowing a programmer to define a set of proprietary functions, which may form a higher level, client specific sublanguage, that may be executable at a client. Existing style sheets may then be extended to provide for operating system specific functionality. In one example described previously, a programmer may write style sheets for specific client operating systems to conform the look of an application schema with the operating system schema.

Extending a style sheet language may normally require a great expenditure of resources to petition a standards board to adopt new functions. The claimed system enables a programmer to define a custom set of style sheet functions that can be exported with the client application. Moreover, by referencing a registry, user originated changes to schema colors may be reflected in the application browser user interface, without having to code for changes using extensive conditionals, which may end up being quite complex if the parameter choices are many. Further, by writing proprietary functions that may reference the operating system registry of a client, the coding process may be simplified. For example, instead of coding hexadecimal values as parameters in a standard style sheet function, programmers may now simply use operating system values, such as BUTTON_COLOR which may be translated by the preprocessing component to yield the compliant color values. This may reduce coding work.

While the embodiments mentioned involve conforming display schemas, the claimed system may be used in other user interface applications managed by a registry, for example, user input functionality. For example, a client application may want to conform a set of operating system input keys such as file open, close, edit, etc. By referencing the client operating system registry, a program can conform key mappings. Of course, the claimed system may be further extended to other registry defined operating system characteristics. The preprocessor may simply need to be coded with the appropriate lookup functions. Moreover, updates to this model may require providing an updated applet in the form of a plugin, which makes extensibility easier as programmers may predefine their set of proprietary functions and port a preprocessor having the definitions over for each client server release of an application.

The invention claimed is:

1. A computer implemented method of dynamically generating cascading style sheets for a client application, comprising:
   providing a first style sheet containing a noncompliant function to a standard style sheet language according to W3C cascading style sheet specification;
   retrieving the first style sheet at a client from a server;
   extracting from the first style sheet the noncompliant function;
   executing the noncompliant function at the client to produce a function output wherein the noncompliant function transforms a noncompliant color value according to W3C cascading style sheet specification that is operating system specific into a standard style sheet language compliant color value according to W3C cascading style sheet specification;
   generating a second style sheet based on the first style sheet and the function output, wherein the second style sheet is compliant according to W3C cascading style sheet specification; and
   executing the second style sheet on a standard style sheet language compliant browser according to W3C cascading style sheet specification at the client.

2. The method of claim 1, wherein generating a second style sheet comprises replacing the noncompliant function in the first style sheet with the function output.

3. The method of claim 1, wherein the noncompliant function provides a parameter of a cascading style sheet (CSS) compliant function.

4. The method of claim 1, wherein executing the noncompliant function comprises looking up a registry value in a client operating system registry to produce an output.

5. The method of claim 1, wherein a change to the registry value dynamically changes the second style sheet.

6. The method of claim 1, wherein the noncompliant function blends a first and a second color value to produce a third color value compliant with a standard style sheet language function according to W3C cascading style sheet specification.

7. The method of claim 1, wherein the noncompliant function is executed based on a client operating system function.

8. The method of claim 1, wherein executing the noncompliant function comprises executing the noncompliant function via a client executable.

9. The method of claim 1, wherein executing the noncompliant function comprises executing the noncompliant function by one of a browser applet, a browser extension, and a browser plugin.

10. A computer system comprising:
    a processor being physically configured to execute a browser application being compliant with a standard style sheet language according to W3C cascading style sheet specification;
    a client computer comprising a processor being physically configured for receiving a first style sheet, containing noncompliant computer executable code to the standard style sheet language according to W3C cascading style sheet specification, from a server for display on the browser; and
    a preprocessor component intercepting the first style sheet before executing the first style sheet in the browser, extracting the noncompliant computer executable code wherein the noncompliant computer executable code transforms a noncompliant color value according to W3C cascading style sheet specification that is operating system specific into a standard style sheet language compliant color value according to W3C cascading style sheet specification and generating a second style sheet compliant with the standard style sheet language according to W3C cascading style sheet specification.

11. The system of claim 10, wherein the browser forms a portion of an application of the client computer.

12. The system of claim 10, wherein the preprocessor is coded as a portion of the browser.

13. The system of claim 10, wherein the preprocessor is one of a browser applet, a browser extension, and a browser plugin.

14. The system of claim 10, wherein the preprocessor generates the second style sheet by executing the noncompliant computer executable code to produce an output compliant with a standard style sheet language according to W3C cascading style sheet specification and replacing the noncompliant computer executable code in the first style sheet with the compliant output.

15. The system of claim 10, wherein the noncompliant code comprises an operating system specific value and wherein generating a second style sheet comprises obtaining a generic value for the operating system specific value from a registry and replacing the noncompliant code in the first style sheet with the generic value.

16. The system of claim 10, wherein the noncompliant code comprises a computer executable function that accepts two color values and produces a third value that is compliant with a standard style sheet language function according to W3C cascading style sheet specification that is capable of only a single color parameter value.

* * * * *